US007844352B2

(12) United States Patent
Vouzis et al.

(10) Patent No.: US 7,844,352 B2
(45) Date of Patent: Nov. 30, 2010

(54) ITERATIVE MATRIX PROCESSOR BASED IMPLEMENTATION OF REAL-TIME MODEL PREDICTIVE CONTROL

(75) Inventors: Panagiotis Vouzis, Bethlehem, PA (US);
Leonidas Bleris, Cambridge, MA (US);
Mark G. Arnold, Bethlehem, PA (US);
Mayuresh V. Kothare, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 202 days.

(21) Appl. No.: 11/876,440

(22) Filed: Oct. 22, 2007

(65) Prior Publication Data

US 2008/0097625 A1    Apr. 24, 2008

Related U.S. Application Data

(60) Provisional application No. 60/862,236, filed on Oct. 20, 2006.

(51) Int. Cl.
*G05B 13/02* (2006.01)
*G06F 19/00* (2006.01)
*G06F 7/38* (2006.01)
*G06F 7/52* (2006.01)

(52) U.S. Cl. ............................. 700/44; 700/29; 700/173; 708/232; 708/607

(58) Field of Classification Search .................. 700/44; 708/232, 608
See application file for complete search history.

(56) References Cited

U.S. PATENT DOCUMENTS

| | | | |
|---|---|---|---|
| 5,394,322 A | 2/1995 | Hansen | |
| 5,410,477 A | 4/1995 | Ishii et al. | |
| 5,682,309 A | 10/1997 | Bartusiak et al. | |
| 5,682,317 A | 10/1997 | Keeler et al. | |
| 5,687,082 A | 11/1997 | Rizzoni | |
| 5,943,663 A | 8/1999 | Mouradian | |
| 5,954,783 A | 9/1999 | Yamaguchi et al. | |
| 6,064,809 A | 5/2000 | Braatz et al. | |
| 6,092,017 A | 7/2000 | Ishida et al. | |
| 6,285,971 B1 | 9/2001 | Shah et al. | |
| 6,330,483 B1 | 12/2001 | Dailey | |
| 6,439,469 B1 | 8/2002 | Gruber et al. | |
| 6,879,971 B1 | 4/2005 | Keeler et al. | |

(Continued)

OTHER PUBLICATIONS

Bleris, L.G., Garcia, J.G., Kothare, M.V. and Arnold, M.G. "Towards Embedded Model Predictive Control for System-On-A-Chip Applications" Journal of Process Control vol. 16 Issue 3 (Mar. 2006): 255-264, and available online Jul. 28, 2005.*

(Continued)

*Primary Examiner*—Charles R Kasenge
*Assistant Examiner*—Sivalingam Sivanesan
(74) *Attorney, Agent, or Firm*—McNees Wallace & Nurick, LLC

(57) ABSTRACT

A system for embedding real-time Model Predictive Control (MPC) in a System-on-a-Chip (SoC) devices is provided. In the system, a microprocessor is connected to an auxiliary unit or application-specific matrix coprocessor. The microprocessor can control the operation of the MPC algorithm, i.e., carry out the tasks of input/output for the MPC algorithm, initialize and send the appropriate commands to auxiliary unit and receive back the optimal control moves or instructions from auxiliary unit. The auxiliary unit can operate as a matrix coprocessor by executing matrix operations, e.g. addition, multiplication, inversion, etc., required by the MPC algorithm.

18 Claims, 5 Drawing Sheets

U.S. PATENT DOCUMENTS

| | | | |
|---|---|---|---|
| 7,060,059 | B2 | 6/2006 | Keith et al. |
| 7,152,023 | B2 | 12/2006 | Das |
| 7,197,485 | B2 | 3/2007 | Fuller |
| 7,203,554 | B2 | 4/2007 | Fuller |
| 2002/0198911 | A1* | 12/2002 | Blomgren et al. ........... 708/232 |
| 2003/0078684 | A1* | 4/2003 | Martin et al. ................. 700/44 |
| 2004/0122887 | A1* | 6/2004 | Macy ......................... 708/607 |
| 2005/0107895 | A1 | 5/2005 | Pistikopoulos et al. |
| 2007/0071285 | A1* | 3/2007 | Kontsevich ................. 382/103 |

OTHER PUBLICATIONS

Bleris, L. G., Vouzis, P., Arnold, M. G. and Kothare, M. V., A Co-Processor FPGA Platform for the Implementation of Real-Time Model Predictive Control, Proceeding of the 2006 American Control Conference, Jun. 2006, pp. 1912-1917.

Bleris, L. G. and Kothare, M. V., Implementation of Model Predictive Control for Glucose Regulation on a General Purpose Microprocessor, Proceeding of 44th IEEE Conference on Decision and Control and European Control Conference, Dec. 2005, pp. 5162-5167.

Vouzis, P., Bleris, L. G., Kothare, M. V. and Arnold, M. G., Co-Design Implementation of a System for Model Predictive Control. AIChE Annual Meeting, Nov. 2005, 19 pages.

Bleris, L. G. and Kothare, M. V., Real-Time Implementation of Model Predictive Control, Proceedings of 2005 American Control Conference, Jun. 2005, pp. 4166-4171.

Bleris, L. G., Garcia, J. G. and Kothare, M. V. Model Predictive Hydrodynamic Regulation of Microflows, Proceedings of 2005 American Control Conference, Jun. 2005, pp. 1752-1757.

Bleris, L. G., Garcia, J. G., Kothare, M. V. and Arnold, M. G. Towards Embedded Model Predictive Control for System-On-A-Chip Applications, Journal of Process Control, vol. 16, No. 3, Mar. 2006, pp. 255-264.

Garcia, J., Arnold, M. G., Bleris, L. G. and Kothare, M. V., LNS Architectures for Embedded Model Predictive Control Processors. Proceedings of the 2004 International Conference on Compilers, Architecture, and Synthesis for Embedded Systems, Sep. 2004, pp. 79-84.

Bleris, L. G., Kothare, M. V., Garcia, J. and Arnold, M. G., Embedded Model Predictive Control for System-On-A-Chip Applications, 7th International Symposium on Dynamics and Control of Process Systems, Jul. 2004, 6 pages.

* cited by examiner

| Mnem. | $O(1)$ Oper. | Mnem. | $O(n^2)$ Oper. |
|---|---|---|---|
| SETN | $n \leftarrow host$ | INPC | $C \leftarrow host$ |
| SETRC | $\{r, c\} \leftarrow host$ | OUTC | $host \leftarrow C$ |
| GETP | $p \leftarrow host$ | OUTA | $host \leftarrow A$ |
| SETX | $x \leftarrow host$ | LOADC | $C \leftarrow B$ |
| GJ1 | $x \leftarrow -1/A_{i,j}$ $A_{i,j} \leftarrow 1$ | LOADA | $A \leftarrow B$ |
|  |  | STOREC | $B \leftarrow C$ |
| GJ2 | $x \leftarrow -A_{i,j}$ $A_{i,j} \leftarrow 0$ | STOREAZ | $B \leftarrow A$ $A \leftarrow 0$ |
| Mnem. | $O(n)$ Oper. | STOREAI | $B \leftarrow A$ $A \leftarrow I$ |
| LOADVA | $A_i \leftarrow b$ |  |  |
| STOREVA | $b \leftarrow A_i$ | ADDX | $A \leftarrow A + xB$ |
| STOREVAZ | $b \leftarrow A_i$ $A_i \leftarrow 0$ | MULX | $A \leftarrow xA$ |
|  |  | MULV | $A \leftarrow Cb$ |
| ADDXVA | $A_i \leftarrow A_i + xb$ |  |  |
| SUMVA | $x \leftarrow \sum_{i=1}^{n} A_i$ |  |  |
| POW2A | $A_i \leftarrow 1/b^2$ |  |  |
| POW3A | $A_i \leftarrow 1/b^3$ |  |  |
| PIVOT | $x \leftarrow \max(|C_{i,j}|, ..., |C_{n-1,j}|)$ $p \leftarrow i$ such that $C_{i,j} = x$ |  |  |

FIGURE 6

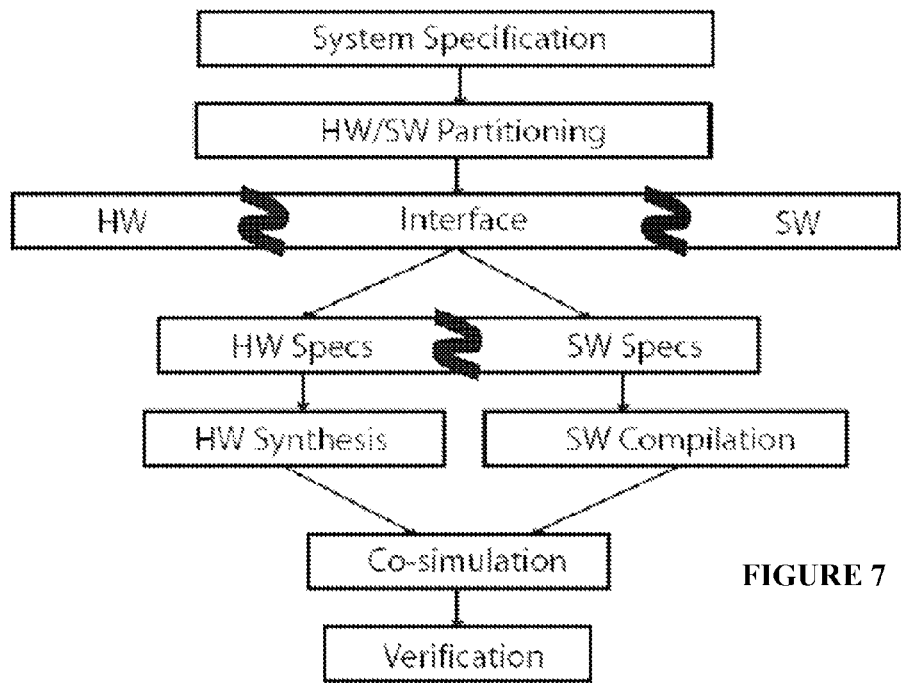

FIGURE 7

ITERATIVE MATRIX PROCESSOR BASED IMPLEMENTATION OF REAL-TIME MODEL PREDICTIVE CONTROL

CROSS-REFERENCE TO RELATED APPLICATIONS

This application claims the benefit of U.S. Provisional Application No. 60/862,236 filed on Oct. 20, 2006, which Application is hereby incorporated by reference.

REFERENCE TO COMPUTER PROGRAM LISTING APPENDIX

This application includes the computer program listings in Appendices A and B that are provided electronically in a single file with the application. Appendices A and B are hereby incorporated by reference into this application in their entirety.

BACKGROUND

The application generally relates to Model Predictive Control (MPC) applications. The application relates more specifically to implementing real-time model predictive control on a chip for portable and System-on-a-Chip (SoC) devices using a microprocessor in parallel with an iterative matrix processor.

System-on-a-Chip (SoC) relates to the packaging of all the necessary components, e.g., microprocessors, memory, etc., for a "system" onto a single substrate or chip. Some areas where SoC devices might be used include medicine and bioengineering (prosthetics, genetics and small molecule sensors, drug delivery), avionics and aerospace (microscale actuators and sensors, smart reconfigurable geometry wings and blades, microgyroscopes), automotive systems and transportation (accelerometers), microchemical systems and microreactors for in situ and on-demand chemical production. Naturally, the functionality and performance of any of the aforementioned applications is directly related to the reliability and quality of the control logic used.

One type of control logic that may be used for SoC applications is Model Predictive Control (MPC). MPC is an established control technique that has been used in the chemical process industry. The ability of MPC to handle Multiple-Input-Multiple-Output (MIMO) systems and to take into account constraints and disturbances explicitly has increased the interest in using MPC for a wider range of applications outside the process industry. However, it has been difficult to implement MPC in portable and SoC devices because MPC is a computationally expensive control algorithm that involves the solution of an optimization problem at every time step.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a system including a plant controlled by real-time model predictive control, an iterative matrix processor configured to perform computations on vectors and matrices stored in a logarithmic format, and a general purpose processor in communication with the plant and the iterative matrix processor to transfer information between the plant and the iterative matrix processor. The general purpose processor is configured to issue a sequence of instructions to the iterative matrix processor to implement the model predictive control. Each instruction of the sequence of instructions initiates a series of element-by-element operations in the logarithmic format on scalars, vectors and matrices stored in the iterative matrix processor.

Some additional features of the embodiment include the iterative matrix processor is configured to execute matrix by vector multiplication, scalar by vector multiplication, matrix-element zeroing, matrix-element negation, matrix-element reciprocal, vector-reciprocal square, vector-reciprocal cube, vector sum, vector multiply-accumulate, or matrix multiply-accumulate. The matrix-element reciprocal operation results in a negation in the logarithmic format, the vector-reciprocal square operation results in a shift and negation in the logarithmic format, the vector-reciprocal cube operation results in a shift, add and negation in the logarithmic format.

Further additional features of the embodiment include the iterative matrix processor including a pipelined logarithmic processor. The pipelined logarithmic processor is configured to execute matrix by vector multiplication, scalar by vector multiplication, vector sum, vector multiply-accumulate, matrix multiply-accumulate, matrix-element reciprocal, vector-reciprocal square, and vector-reciprocal cube. The iterative matrix processor delays computation with a later portion of a matrix while computing with an earlier portion of the matrix in response to a size of the matrix being small compared to a depth of the pipelined logarithmic processor. The computation delay is a predetermined number of clock cycles related to the depth of the pipelined logarithmic processor.

Another embodiment relates to a controller to implement a real-time model predictive control algorithm. The controller includes a microprocessor to execute a portion of the model predictive control algorithm and an iterative matrix processor configured to perform at least one matrix calculation of the model predictive control algorithm, and the iterative matrix processor being configured to operate using a logarithmic number system.

Some additional features of the embodiment include the iterative matrix processor is configured to execute a single multiply-accumulate operation at each clock cycle. The iterative matrix processor is configured to execute multiple multiply-accumulate operations at each clock cycle. The iterative matrix processor is configured to execute a one-bit of a multiply-accumulate operation at each clock cycle. The iterative matrix processor is configured to execute at least one of matrix by vector multiplication, scalar by vector multiplication, matrix-element zeroing, matrix-element negation, matrix-element reciprocal, vector-reciprocal square, vector-reciprocal cube, vector sum, vector multiply-accumulate, or matrix multiply-accumulate.

In one version of the controller, the iterative matrix processor performs addition by $$\log_b(|X+Y|) = \max(x, y) + s_b(z),$$

where $s_b(z) = \log_b(1+b^z), z = -|x-y|$, and the iterative matrix processor performs subtraction by $$\log_b(|X - Y|) = \max(x, y) + f(z)$$

where $x = \log_b(X)$, $y = \log_b(X)$, $z = -|x - y|$, $$f(z) = \begin{cases} z + F_1(z_h) + s_b(F_2(z_l) - z - F_1(z_h)) & \text{when } z \neq -\delta_h \text{ and } z \notin [-n\delta_h, -\log_b(2b^{(n-1)\delta_h} - 1)] \\ F_2(z_l) & \text{when } z = -\delta_h \\ d_b(-n\delta_h + z_l) & z \in [-n\delta_h, -\log_b(2b^{(n-1)\delta_h} - 1)] \end{cases}$$

where $F_1(z_h) = d_b(-z_h - \delta_h)$, $F_2(z_l) = d_b(z_l - \delta_h)$, $$s_b(z) = \log_b(1 + b^z), d_b(z) = \log_b(1 - b^z), \delta_h = 2^{j-f}, f$$

is the number of fractional bits in the number z, $z_l$ is j least significant bits of the number z (j is a parameter chosen by the designer), $z_l$ is the remainder of the bits of the number z (i.e., k+f−j, where k is the number of integer bits of the number z), and n=0,1, ... $2^{k-1}/\delta_h$.

In another version of the controller the iterative matrix processor performs addition by $$\log_b(|X + Y|) = \max(x, y) + s_b(z)$$

where $x = \log_b(X)$, $y = \log_b(X)$, $z = -|x - y|$, $$s_b(z) = \begin{cases} 0, & z \leq e_{s_b} \\ \log_b(1 + b^z) & e_{s_b} < z < 0 \\ \log_b(2) & z = 0 \\ z & z > 0 \end{cases},$$

$e_{s_b} = \log_b(2^{2-f} - 1)$, and the iterative matrix processor performs subtraction by $$\log_b(|X-Y|) = \min(x, y) + f_b(z)$$

where $x=\log_b(X)$, $y=\log_b(X)$, $z=|x-y|$,
$f_b(z)=z_l+F_4(Z_h)+s_b(F_3(z_l)-F_4(z_h))$ $F_3(z_l)=d_b(-z_l)$, $F_4(z_h)=d_b(z_h)$,
$d_b(z)=\log_b(1-b^z)$, $z_l$ is the j least significant bits of the number z (j is a parameter chosen by the designer), $z_l$ is the rest of the bits of the number z (k+f−j, where k is the number of integer bits of the number z and f is the number of fractional bits of the number z), when $z_l=0$ and $z_h>0$ then $F_3(0)$ is converted to a number smaller than $-e_{s_b}+d_b(2^{-f})$, and when $z_l \geq 0$ and $z_h=0$ $F_4(0)$ is converted to a number smaller than $-e_{s_b}+d_b(z_l)-z_l$.

Yet another embodiment relates to a model predictive controller including a general purpose processor to execute a model predictive control algorithm, and an auxiliary unit in communication with the general purpose processor. The auxiliary unit is configured to execute at least one matrix calculation required by the model predictive control algorithm in response to receiving an instruction from the general purpose processor. The auxiliary unit performs the at least one matrix calculation using a logarithmic number system.

Certain advantages of the embodiments described herein are low-power characteristics with increased performance (i.e., be efficient enough to handle the dynamics of a fast system in real time), occupation of a small area and the ability to be mass-produced with low cost. The design methodology used develops an architecture that is efficient both in power consumption and performance, while being sufficiently flexible to be embedded in bigger systems that need to include MPC in their functionality.

Alternative exemplary embodiments relate to other features and combinations of features as may be generally recited in the claims.

BRIEF DESCRIPTION OF THE FIGURES

FIG. 6 illustrates a command set for the auxiliary unit.

FIG. 7 is a flow chart showing one methodology for designing an auxiliary unit to provide model predictive control.

DETAILED DESCRIPTION OF THE EXEMPLARY EMBODIMENTS

Figure 1:
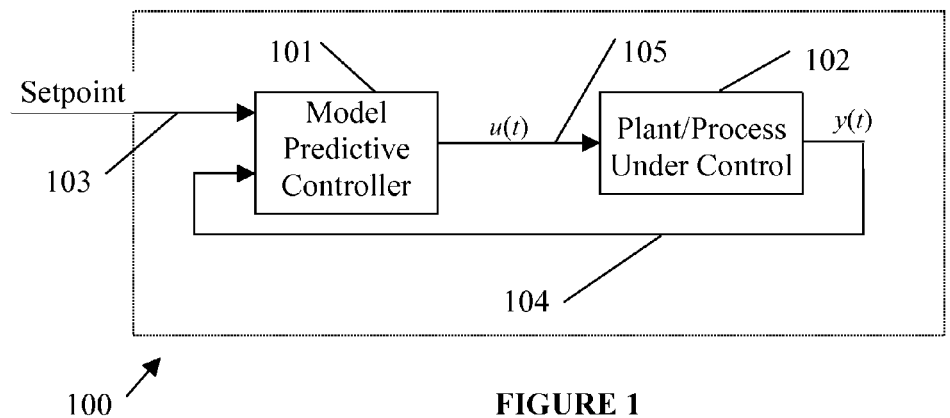
FIG. 1 is a schematic illustration of the basic logic for a model predictive control algorithm.

FIG. 1 illustrates a basic block diagram of a Model Predictive Control (MPC) structure. MPC (or receding-horizon control or moving-horizon control) is an algorithm that uses a model describing the system under control. In MPC, there can be many different formulations of the models that are used. One model that may be used is a step-response model, which is obtained from the measurement of the output when the system is excited with a step input. Another model that may be used is the impulse-response model, which is obtained by applying an impulse to the input. Still other models that may be used are a transfer-function model that requires only a few parameters or a state-space model that can describe multivariable processes.

In MPC, the future outputs of the system are calculated at each sample interval over a prediction horizon using the process model of the system. Next, a set of future control moves or input moves is calculated by optimizing a determined criterion (while also taking into account any system constraints) in order to keep the process as close a possible to a predefined reference trajectory. The criterion can be (but does not have to be) a quadratic function of the difference between the predicted output signal and the reference trajectory. The first control move u(t|t), resulting from the optimization of the determined criterion, is sent to the system while the remaining control moves are discarded. The remaining control moves can be discarded because at the next sampling instant the output of the system is measured and the procedure is repeated with the new measured values to obtain past and current input values.

In one embodiment of an MPC control, at time step t, the model is used to predict a series of k future outputs of the system up to time t+k, i.e., y(t+k|t) for k=1, . . . P. The next step is to calculate M optimal future input moves, u(t+k|t) for k=0, 1, . . . , M, in order to enable the process to follow a desired trajectory, $y_{ref}$, as closely as possible. The parameters P and M are referred to as the prediction and control horizons, respectively.

The criterion for the optimal future moves is usually a quadratic cost function of the difference between the predicted output signal and the desired trajectory, which can include the control moves u(t+k|t) in order to minimize the control effort. A typical objective function has the form:

$$J_P(t) = \sum_{k=0}^{P} \{[y(t+k \mid t) - y_{ref}]^2 + Ru(t+k \mid t)^2]\} \tag{1}$$

$$|u(t+k \mid t)| \le b, k \ge 0, \tag{2}$$

where R is a design parameter used to weight the control moves, and b is the vector of the constraint that the future inputs have to obey. In one embodiment, only the first M control moves are calculated, and the following (P−M) control moves are assumed to be zero. Out of the M moves given by the minimization of the objective function, only the first one is used; the rest are discarded, since at the next sampling instant the output is measured and the procedure is repeated with the new measured values and by shifting the control and prediction horizon ahead.

The future optimal moves are based on the minimization of the objective function (Equation 1), which can be achieved in one embodiment with Newton's method based on a state-space model of the linear system. However, it would be understood to one skilled in the art that many different optimization algorithms can be used. The state-space model of the linear system to be used in Newton's method can be given by:

$$\begin{cases} x(t+1) = Ax(t) + Bu(t) \\ y(t) = Cx(t), \end{cases} \tag{3}$$

where x is the state and A, B, C are the matrices describing the model of the system, resulting in the prediction model $$y(t+k \mid t) = C\left[A^k x(t) + \sum_{i=1}^{k} A^{k-1} Bu(t+k-i \mid t)\right]. \tag{4}$$

The constraints are incorporated in the cost function by using penalty functions for the inequality constraints defined as $$d_i = \mu_i \frac{1}{u_i - b_i}, \tag{5}$$

resulting in the unconstrained non-linear problem:

$$\underset{u}{\text{minimize}}\, f(u) = \frac{1}{2}u^T Gu + g^T u + \sum_i d_i(u), \tag{6}$$

where $\mu_i$ are the Lagrange multipliers.

In one embodiment, the minimization problem of Equation 6 can be solved numerically by approximating f(u) with a quadratic function around u, obtaining the gradient $\nabla(f(u))$ and the Hessian H(f(u)), and iterating $$u(t+1) = u(t) - H(f(u))^{-1} \cdot \nabla (f(u)), \tag{7}$$

where $$\nabla (f(u)) = \Gamma_u u + \Gamma_x x + \Gamma_y + p\Phi \tag{8}$$

$$H(f(u)) = \Gamma_u + (2\mu I_M \Psi) \cdot I, \tag{9}$$

$$I_M = \overline{[11 \ldots 11]}, \tag{10}$$

$$\Phi = \left[\frac{1}{(u_1 \ldots b)^2} \cdots \frac{1}{(u_1 + b)^2} \cdots \frac{1}{(u_M \ldots b)^2} \cdots \frac{1}{(u_M + b)^2}\right]^T, \tag{11}$$

$$\Psi = \left[\frac{1}{(u_1 - b)^3} + \frac{1}{(u_1 + b)^3} \cdots \frac{1}{(u_M \ldots b)^3} + \frac{1}{(u_M + b)^3}\right]^T, \tag{12}$$

and I is an M×M identity matrix.

When using Newton's method there are numerous matrix operations that are required, such as matrix-by-vector multiplications, matrix additions and matrix inversions, whose computational complexity depends on the size of the control horizon M, and on the number of states N. The sizes of the matrices that can be involved are: u, $\Gamma_y$, $\Phi$, $\Psi$ are M×1, x is N×1, $\Gamma_u$ is M×M, and $\Gamma_x$ is M×N.

In the embodiment shown in FIG. 1, a system 100 includes a plant or process under control 102 and a controller 101 that uses an MPC algorithm to calculate a control instruction or move for plant 102 at each time step. The controller 101 generates or outputs a series of control actions (u(t)) 105 that control or direct the operation of plant 102 towards a desired or predetermined setpoint 103 provided by a user of the system 100. In addition, controller 101 receives one or more signals corresponding to the state or overall operating condition of the plant (y(t)) 104 by a feedback measurement at each time step. In another embodiment, some of the states or particular operating conditions of the plant 102 can be estimated if they are not observable or measurable.

Figure 2:
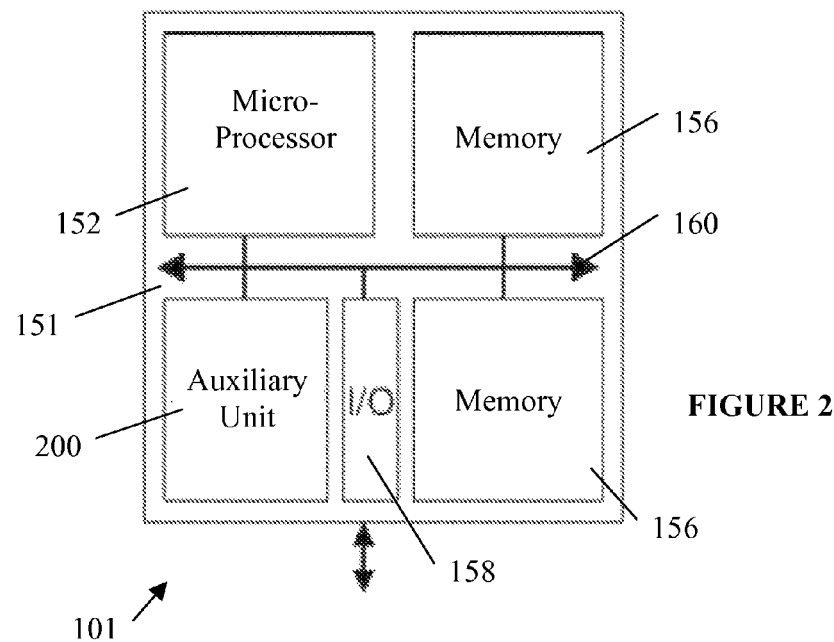
FIG. 2 is a schematic illustration of one embodiment of a system-on-a-chip application for executing a model predictive control algorithm.

FIG. 2 illustrates one architecture for a model predictive controller 101. The controller 101 is provided on a substrate or chip 151. Mounted on or in chip 151 is a microprocessor 152, an auxiliary unit or co-processor 200, memory devices 156, and input/output connections (I/O) 158, e.g., to plant 102, that are connected together by one or more buses 160. The controller 101 may include many other features or components that are not shown in FIG. 2.

In the architecture shown in FIG. 2, microprocessor 152 can be a conventional or "off-the-shelf" microprocessor that can execute the software part of the MPC algorithm. In addition, the microprocessor 152 can also be responsible for the initialization and control of the auxiliary unit 200, e.g., initialize and send the appropriate commands to auxiliary unit 200 and receive back the optimal control moves or instructions from auxiliary unit 200, and the input/output for the MPC algorithm. The auxiliary unit 200 can occupy a smaller area than microprocessor 152 (but could also occupy a larger area than microprocessor 152) and can operate as a matrix coprocessor by executing matrix operations, e.g. addition, multiplication, inversion, etc., required for the MPC algorithm, such as the matrix operations required by Newton's optimization algorithm. In addition, auxiliary unit 200 can store the intermediate results and the matrices involved in the MPC algorithm for subsequent processing. Auxiliary unit 200 can be tailored or configured to accelerate the computationally demanding operations in the MPC algorithm. The auxiliary unit 200 can be configured to communicate with microprocessor 152 only at specific times or events, e.g., at initialization or the return or sending back of the results of the MPC algorithm to microprocessor 152. By minimizing the communications between microprocessor 152 and auxiliary unit 200 the communication overhead for the MPC controller 101 can be reduced.

Figure 3:
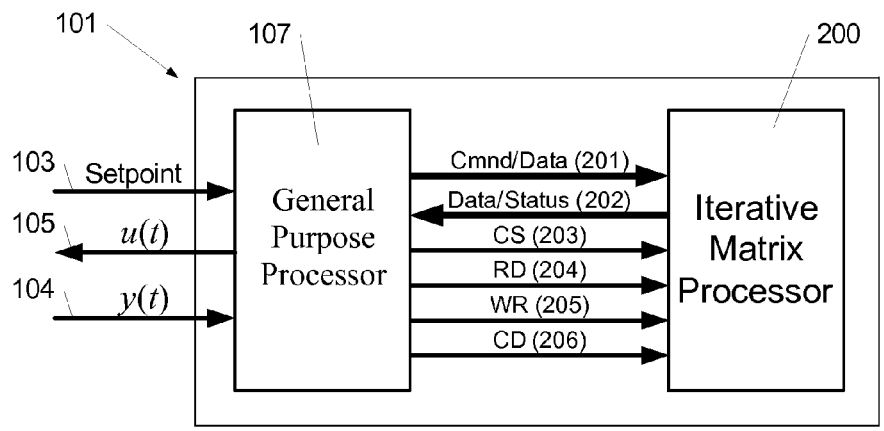
FIG. 3 is a schematic illustration of another embodiment of a system-on-a-chip application for executing a model predictive control algorithm.

FIG. 3 illustrates a controller architecture for executing an MPC algorithm on a chip. The MPC controller 101 shown in FIG. 3 includes a general-purpose processor (GPP) 107 and an auxiliary unit (or iterative matrix processor as shown in FIG. 3) 200. The general-purpose processor 107 can include microprocessor 152, memory devices 156, and input/output connections (I/O) 158 that are connected together by one or more buses 160. The MPC controller 101 may include many other features or components that are not shown in FIG. 3.

The GPP 107 implements the communication interface, e.g., the u(t) signal 105 and y(t) signal 104, between the plant under control 102 and the controller 101. The GPP 107 also receives information from the user, e.g., the setpoint signal 103. The MPC algorithm can be carried out by the Iterative Matrix Processor (IMP) or auxiliary unit 200. The IMP 200 executes the bulk of the arithmetic operations for the calculation of the control instructions or moves in a Logarithmic Number System (LNS), and is custom-designed to accelerate operations that are particularly slow when implemented in a Floating Point (FP) number system.

In other words, the IMP 200 can perform computations on vectors and matrices stored in a LNS format. The GPP 107 is used for interfacing to the controlled plant 102, for transferring information between the controlled plant 102 and the IMP 200, and for issuing a sequence of instructions to the IMP 200 for implementing particular MPC algorithmic operations.

The auxiliary unit or IMP 200 can use an LNS to execute the arithmetic operations required by the MPC algorithm. The LNS can be used as an alternative to FP arithmetic, and, for a word length up to 32-bits, LNS arithmetic is more efficient than FP arithmetic, with an increasing efficiency as the word length decreases. By using the LNS, both the microprocessor 152 and auxiliary unit 200 can be configured for a 16-bit word length, which length can be used to execute the operations of the MPC algorithm in the auxiliary unit 200. The choice of the appropriate word length depends on the microprocessor used, the application or system, and the corresponding accuracy requirements of the application. A corresponding LNS unit configuration for a 16-bit word length would occupy 40% less space than an equivalent FP unit and have a similar delay to the FP unit.

In LNS, a real number, X, is represented by the logarithm of its absolute value, x, and an additional bit, s, denoting the sign of the number X:

$$x = \{s \cdot \text{round}(\log_b(|X|))\}, \tag{13}$$

where s=0 for X>0, s=1 for X<0, and b is the base of the logarithm. The round (·) operation approximates x so that it is representable by N=K+F bits in two's-complement format. The number of integer K and fractional F bits is a design choice that determines the dynamic range and the accuracy respectively. In one embodiment K=6 and F=9.

In LNS, real-number multiplication, division, squaring, cubing and inverse are simplified considerably compared to a fixed-point representation, since they are converted to addition, subtraction, shifting, shifting-and-addition and negation, respectively:

$$\log_b(|X \cdot Y|) = \log_b(|X|) + \log_b(|Y|) = x + y \tag{14}$$

$$\log_b(|X/Y|) = \log_b(|X|) - \log_b(|Y|) = x - y \tag{15}$$

$$\log_b(|X|^2) = 2\log_b(|X|) = 2x = x << 1 \tag{16}$$

$$\log_b(|X|^3) = 2\log_b(|X|) + \log_b(|X|) = x << 1 + x \tag{17}$$

$$\log_b(|1/X|) = \log_b(|X|^{-1}) = -\log_b(|X|) = -x. \tag{18}$$

For the first three operations (multiplication, division and squaring) the sign bit, s, is determined by performing an "exclusive or" (XORing) with the sign bits of the two operands, while for the last two operations (cubing and inverse) the sign bit does not change.

The operations of addition and subtraction can be more expensive, and can account for most of the delay and area cost of an LNS implementation. A simple algorithm usually used is described by:

$$\log_b(X + Y) = \log_b\left(X\left(1 + \frac{Y}{X}\right)\right) = x + s_b(z) \tag{19}$$

$$\log_b(X - Y) = \log_b\left(X\left(1 - \frac{Y}{X}\right)\right) = x + d_b(z), \tag{20}$$

where $z=|x-y|$, $s_b=\log_b(1+b^z)$ and $d_b=\log_b(1-b^z)$. In one embodiment, the implementation for the addition and subtraction functions is to store them in Look-Up Tables (LUTs) with respect to all the possible values of z. In another embodiment, a cotransformation technique can be used where additional functions are stored, but overall considerable memory savings are achieved, without compromising the accuracy in the final result.

Referring back to FIG. 3, the auxiliary unit or the IMP 200 operates as a peripheral device of GPP 107 by having dedicated a part of the address space of microprocessor 152. The address space of the microprocessor 152 required to access the IMP 200 can be limited to two memory locations since the microprocessor 152 has to send commands and data to the auxiliary unit or IMP 200, and read back the available data and the status of auxiliary unit or IMP 200. Additionally, four more signals are used by the microprocessor 152 for controlling the auxiliary unit 200: Chip-Select (CS) 203 to signal the selection of the auxiliary unit 200, Read (RD) 204 to signal reading by auxiliary unit 200, Write (WR) 205 to signal writing by auxiliary unit 200, and Data-or-Status (CD) 206 to distinguish between data and status information from auxiliary unit 200.

The IMP or auxiliary unit 200 communicates with the GPP 107 (or microprocessor 152) via bus 201 and bus 202 as well as by the four signals CS 203, RD 204, WR 205, CD 206. When the GPP 107 has to send a command or a 16-bit data word via bus 201 to the IMP 200, the CS signal 203 is 0 (binary); the RD signal 204 is 1 (binary); the WR signal 205 is 0 (binary) and the CD signal 206 is 1 (binary). When the GPP 107 has to read a 16-bit data word via bus 202 from the IMP 200, the signal CS 203 is 0 (binary); the signal RD 204 is 0 (binary); the signal WR 205 is 1 (binary) and the signal CD 206 is 1 (binary). When the GPP 107 has to read the status of the IMP 200 via bus 202, the signal CS 203 is 0 (binary); the signal RD 204 is 0 (binary); the signal WR 205 is 1 (binary) and the signal CD 206 (binary) is 0. The status of the IMP 200 can correspond to four different operational states of the IMP 200 a) the IMP 200 is busy inputting data or a command (BUSY_DI_STATUS); b) the IMP 200 is busy processing data (BUSY_PROC_STATUS); c) the IMP 200 is busy outputting data or the status (BUSY_DI_STATUS); d) the IMP 200 is idle waiting for a command (NORM_STATUS).

The data exchanged between microprocessor 152 (or GPP 107) and auxiliary unit 200 can be divided into two parts. The first part includes the exchange of the required matrices used in every optimization step, which matrices are sent only at the beginning of the algorithm by microprocessor 152 and are stored locally by auxiliary unit 200. Since the matrices are only sent once by microprocessor 152 and then stored by auxiliary unit 200, the corresponding communication overhead is negligible. The second part includes the exchange of the sequence of commands for the optimization algorithm and the optimal control action (as determined by the optimization algorithm) that is sent back to microprocessor 152 at the end of each optimization step executed by auxiliary unit 200.

The auxiliary unit or IMP 200 can operate substantially independent of the GPP 107 (or microprocessor 152). Thus, during the execution of a command by the auxiliary unit 200, GPP 107 can perform or execute any other task of the MPC algorithm and then send the next command to auxiliary unit 200 and/or read back available data from auxiliary unit 200 whenever it is desirable. By permitting GPP 107 and auxiliary unit 200 to operate independently, the execution of the MPC algorithm can be accelerated considerably, since GPP 107 does not have to execute the computationally demanding matrix operations in the MPC algorithm, e.g., the computationally demanding matrix operations described by Equations 8-12, as these operations can be completed in parallel by auxiliary unit 200.

Figure 4:
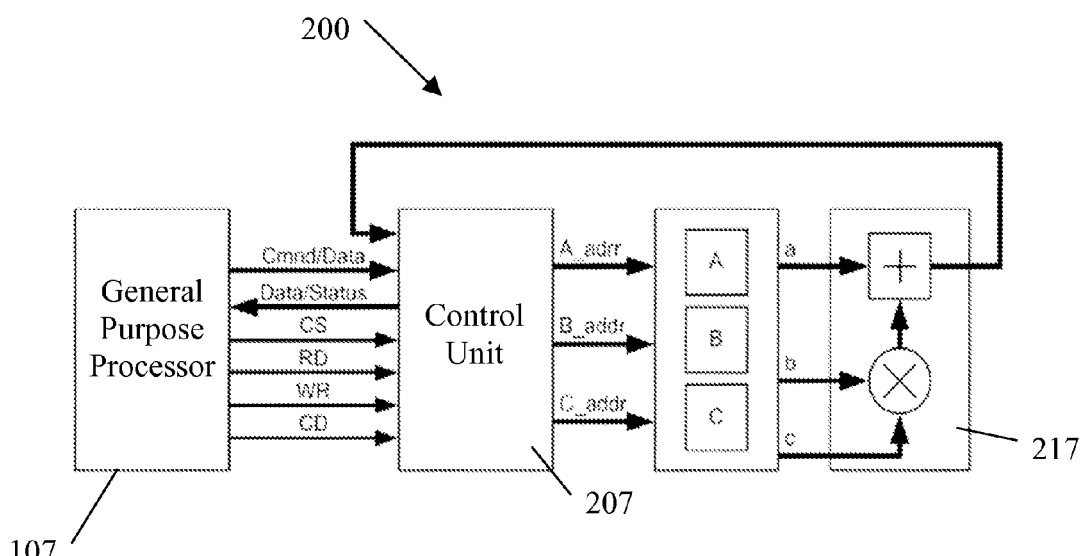
FIG. 4 is a schematic illustration of one embodiment of the microprocessor and the auxiliary unit.
Figure 5:
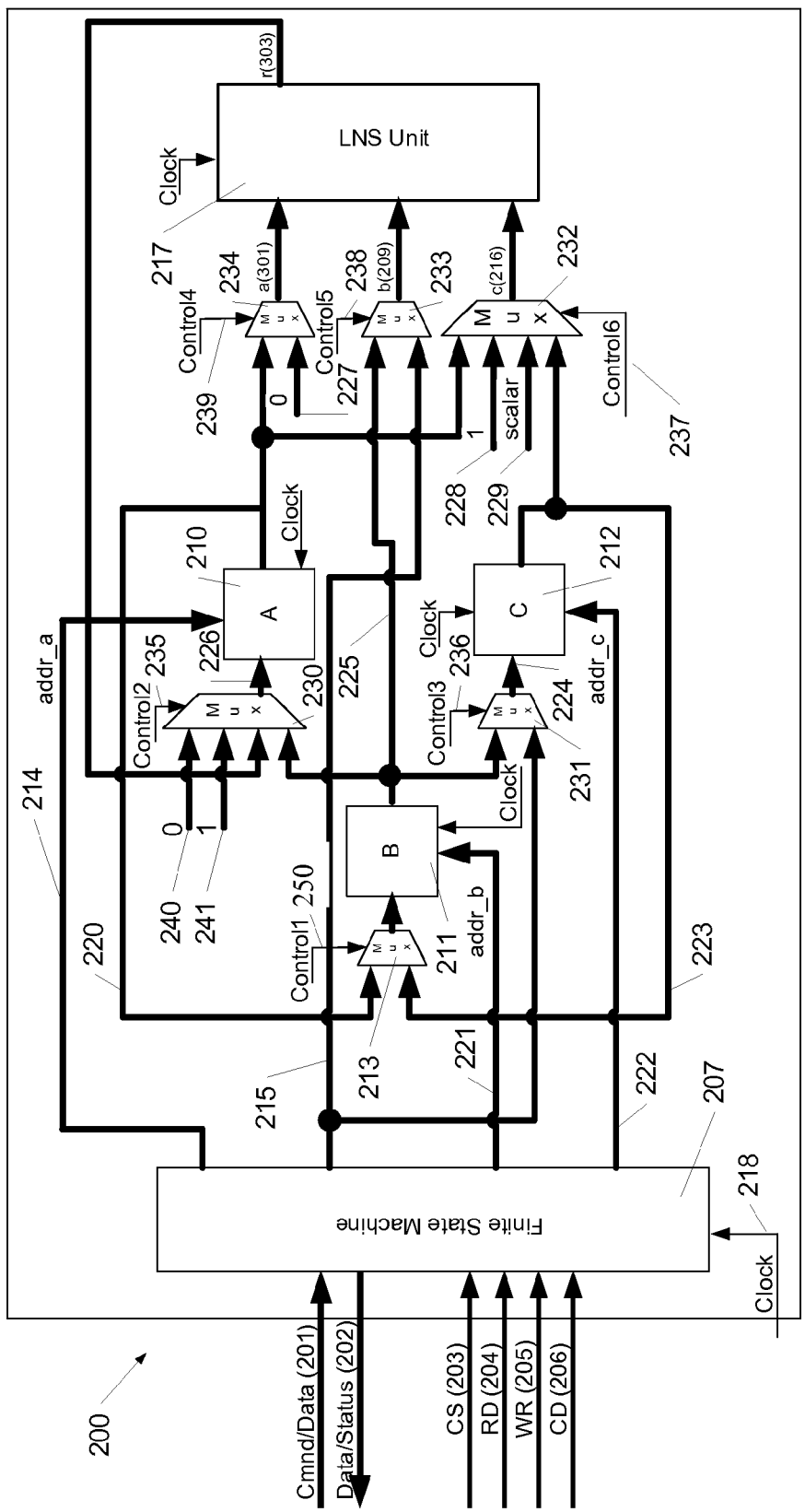
FIG. 5 is a schematic illustration of one embodiment of the auxiliary unit.

In FIGS. 4 and 5, the auxiliary unit or IMP 200 includes a control unit 207, data-memory units 210, 211, 212, an LNS unit 217, and other circuitry, such as multiplexers 213, 230, 231, 232, 233, 234, address busses 214, 221, 222, data busses 209, 215, 216, 220, 221, 222, 223, 224, 225, 226, 227, 228, 229, 240, 241, 301, 303, control signals 235, 236, 237, 238, 239, 250, and the clock signal 218. It is to be understood that the auxiliary unit or IMP 200 may include many other features or components that are not shown in FIGS. 4 and 5.

The auxiliary unit or IMP 200 can be designed to accelerate the computationally intensive blocks of the MPC algorithm, e.g., the matrix operations associated with Newton's algorithm. The auxiliary unit 200 includes an LNS unit 217 that performs or executes the arithmetic operations and a control unit 207 that implements the communication protocol, decodes the commands sent by microprocessor 152 and sends the appropriate data to the LNS arithmetic unit 217 for processing, or to the data-memory units 210, 221, 212 by controlling the signals 235, 236, 237, 238, 239, 250. In one embodiment, the architecture of auxiliary unit 200 can be designed to improve the performance of GPP 107, while occupying a small area in order to consume minimal energy. The auxiliary unit 200 can manipulate matrices in an iterative fashion, i.e., there is one LNS arithmetic unit 217, that can execute the operation of $a+b \cdot c$, and a number of data-memory units 210, 211, 212 that can store intermediate results. The sequence of operations in auxiliary unit 200 are controlled by control unit 207 that receives a command from microprocessor 152 and, after executing the necessary tasks, signals back the completion of the tasks to microprocessor 152. The control unit 207 can be a Finite-State Machine (FSM) as shown in FIG. 5. A FSM can be a model of behavior that can produce the desired sequence of signal values according to the inputs of the system and the state of the system. For example, the communication between microprocessor 152 and auxiliary unit 200 is implemented by using two state machines on both sides that exchange information according to a predetermined protocol, based on the signals CS 203, RD 204, WR 205 and CD 206.

The FSM 207 is a synchronous controller that communicates with the GPP 107, sends data or its status (via bus 202), receives data or commands (via bus 201), produces the control signals 235, 236, 237, 238, 239, 250 for the multiplexers 213, 230, 231, 232, 233, 234, produces the memory addresses 214, 221, 222 for the data-memory units 210, 211, 212. In one embodiment, the iterative matrix processor 200 can exist as a stand-alone controller without having a GPP 107 and instead use the FSM 207 for those functions, such as to implement the communication between the MPC controller 101 and the plant 102, and to decide on the sequence of commands that need to be executed, that were executed by GPP 107.

Within auxiliary unit 200, the datapath between the control unit 207 and the LNS unit 217 includes two data-memory units A and C 210, 212. Data-memory units A and C 210, 212 can be described as matrix registers, since they store whole data matrices rather than single data words. The data-memory unit or matrix-register C 212 stores one matrix at a time, and only one element of a matrix can be written or read to/from the matrix-register C 212 at a single clock cycle. Similar to matrix-register C 212, matrix-register A 210 stores only one matrix at a time, but in contrast to matrix-registers B and C 211, 212, matrix-register A 210 can be written and read concurrently, if necessary, at each clock cycle. Each of the matrix-registers A and C 210, 212 includes an $n_1 \times n_2$ matrix, where $n_1, n_2 \leq 2^m$ and the constant m determines the maximum-sized matrix processed by LNS unit 217 in a single command.

The LNS unit 217 can execute at each clock cycle the multiply-accumulate operation $r=a+b-c$. The LNS multiplier 208 (see FIG. 8) is implemented by an inexpensive binary adder, while the LNS adder 300 (see FIG. 8) is a specially-designed circuit. To increase the throughput of the IMP 200, more than one LNS unit 217 can be used, and to decrease the size of the IMP 200, a serial version of LNS unit 217 can be used. In one embodiment, the LNS unit 217 can be a pipelined LNS Arithmetic Logic Unit in order to increase the speed of the matrix processor 200. Pipeline registers 318, 319 (denoted by dashed lines in FIG. 8) can be used to have three pipeline stages. The FSM 207 may have to stall or delay a pipelined embodiment of the LNS unit 217 for a number of clock cycles (related to the pipeline depth) when the size of the matrices, $n_2$, is small compared to the pipeline depth because the results will not have had time to have been stored back into the matrix-register A 210 before being read in a later dependent computation. However, it is not necessary to stall or delay the LNS pipeline when $n_2$ is large because the iterative nature in which elements from matrix rows are processed permits the results to be written back before being read in a later dependent computation.

Microprocessor 152 sends $n_1$ and $n_2$ to the auxiliary unit 200, which then defines the size of the matrices needed to execute a particular operation of the MPC algorithm. Matrix-registers A and C 210, 212 are both $16 \times 2^m$ memories. The matrix-register A 210 is a memory that has a port attached or connected to LNS unit 217. As shown in FIG. 5, there is only one LNS unit 217 connected to matrix-register A 210. However, in other embodiments, up to $2^m$ LNS units 217 can be used or connected to matrix-register A 210 due to the highly independent nature of common matrix computation. When $n_1, n_2 < 2^m$, there will be unused rows and columns in matrix-registers A and C 210, 212, which can be ignored by IMP 200. The address calculation for $A_{ij}$ or $C_{kj}$ simply involves concatenation of the row and column indices. Such indices are valid in the range $0 \leq i, k < n$ and $0 \leq j < n_2$.

In addition to matrix-registers A and C 210, 212, the IMP 200 has a main memory, matrix-register B 211 used to store the several matrices needed by the MPC algorithm. The matrix-register B 211 functions as a general-data memory, since it can store many matrices and scalars for future use. In addition, only a single matrix element can be written or read from matrix-register B 211 at a single clock cycle. When microprocessor 152 requests IMP 200 to perform a command, e.g., matrix multiplication, the microprocessor 152 also sends the base address of the other operand stored in matrix-register B 211. Unlike matrix-registers A and C 210, 212, which have unused rows and columns, matrix-register B 211 is stored with conventional row-major order; an $n_1 \times n_2$ matrix takes $n_1 n_2$ rather than $2^{2m}$ words. In one embodiment of operation, all the matrices required by auxiliary unit 200 are stored inside auxiliary unit 200. However, if matrix-register B 211 is not large enough for a particular MPC algorithm, commands are provided to transfer $n_1 n_2$ words at the maximum achievable rate by the interface between microprocessor 152 and auxiliary unit 200. Having the three separate matrix registers 210, 211, 212 permits operations like $A_{ij} \leftarrow A_{ij} + B_{j,k} C_{kj}$ to occur in a single clock cycle.

FIG. 6 shows the operations supported by the auxiliary unit 200 in one embodiment. In FIG. 6, "host" refers to microprocessor 152, i and j are indices provided by microprocessor 152, $A_i$ is a row chosen by microprocessor 152, b and B are vectors and matrices, respectively (stored in matrix-register B 211 at the base address specified by microprocessor 152), I is the identity matrix, 0 is the zero matrix, and x is an LNS scalar value.

Referring back to FIG. 5, the "Control1" signal 250 is controlled by FSM 207 and is used to select, via multiplexer 213, which of the matrix-registers A and C 210, 212 has access to store data in the matrix-register B 211. In the commands STOREVA, STOREVAZ, STOREAI, STOREAZ, matrix-register A 210 is stored in matrix-register B 211 by using the data bus 220, while the address bus 214 defines which word of matrix-register A 210 is stored, and the address bus 221 defines where the word coming from matrix-register A 210 is stored in matrix-register B 211.

The "Control2" signal 235 is controlled by FSM 207 and is used to select, via multiplexer 230, whether matrix-register A 210 receives data from LNS unit 217, via data bus 303 (commands ADXVA, POW2A, POW3A, ADDX, MULX, MULV), or from matrix-register B 211, via data bus 225 (commands LODA, LODVA), or from the constants '0', via data bus 240 (commands STOREVAZ, STOREAZ, GJ2), or from the constant '1', via data bus 241 (commands GJ1, STOREAI). In each of the previous four cases address bus 214 defines the memory address of matrix-register A 210 that is written, and in the case that matrix-register A 210 receives data from matrix-register B 211 the address bus 221 defines the data words that go from matrix-register B 211 to matrix-register A 210.

The "Control3" signal 236 is controlled by FSM 207 and is used to select, via multiplexer 231, whether the matrix-register C 212 receives data from FSM 207, via data bus 215 (command INPC) or from matrix-register B 211, via data bus 225, which is addressed by the address bus 221 (commands LOADC). In both of the previous two cases the matrix-register C 212 is addressed by the address bus 222.

The "Control4" signal 239 is controlled by FSM 207 and is used to select, via multiplexer 234, whether input data bus 301 of LNS unit 217 receives data from matrix-register A 210 (addressed by address bus 214), via data bus 220 (commands ADDX, ADDXVA, MULV), or '0', via data bus 227 (command MULX).

The "Control5" signal 238 is controlled by FSM 207 and is used to select, via multiplexer 233, whether input data bus 209 of LNS unit 217 receives data from matrix-register B 211 (addressed by address bus 221), via data bus 225 (commands ADDX, ADDXVA, MULV, POW2A, POW3A), or from FSM 207, via data bus 215 (commands MULX).

The "Control6" signal 237 is controlled by FSM 207 and is used to select, via multiplexer 232, whether input data bus 216 of LNS unit 217 receives data from the matrix-register A 210 (addressed by address bus 214), via data bus 220 (command MULX), or from matrix-register C 212 (addressed by address bus 222), via data bus 223 (command MULV), or '1', via data bus 228 (command SUMVA), or "scalar", via data bus 229 (command MULX, ADDX, ADDXVA). "Scalar" is a constant data word defined by the "host" of by the commands GJ1, or GJ2, or SUMVA.

Figure 8:
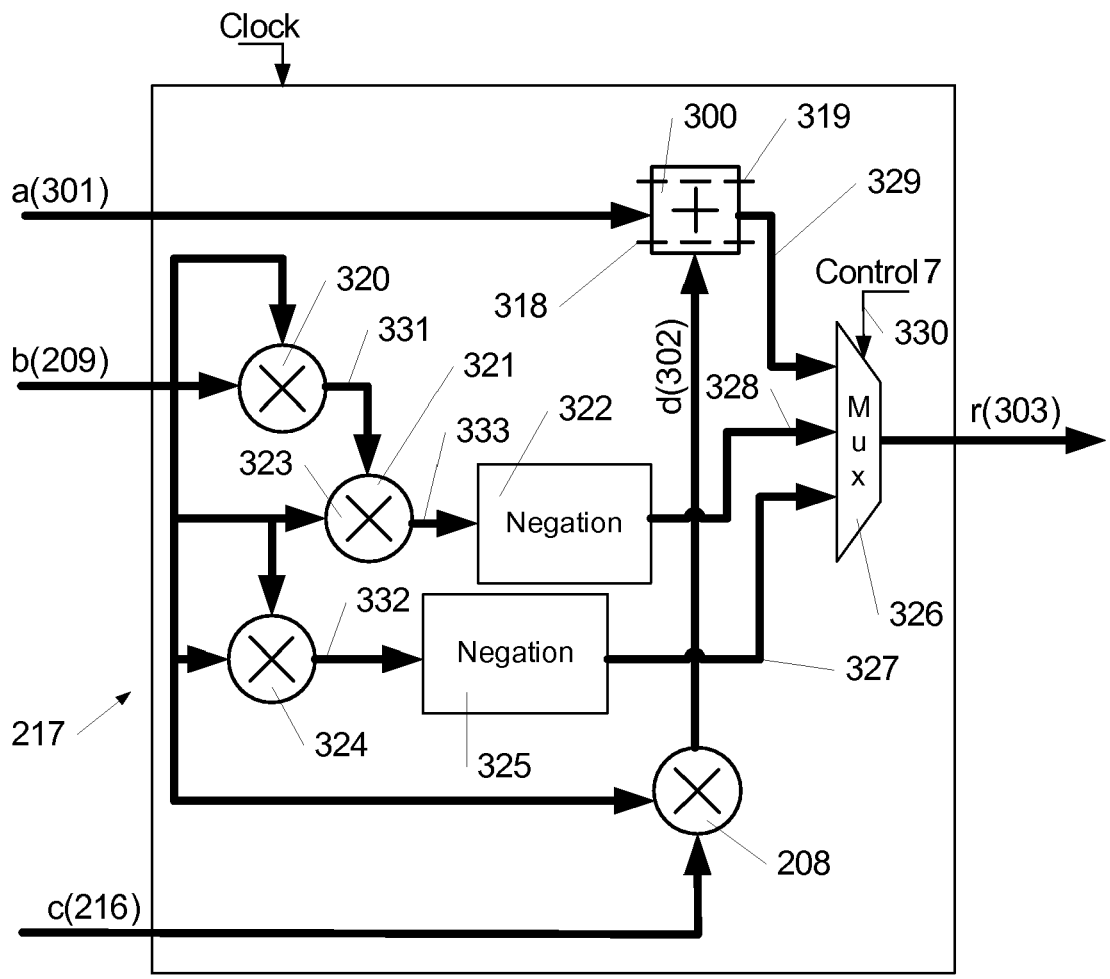
FIG. 8 is a schematic illustration of one embodiment of an LNS unit.

In FIG. 8, the "Control7" signal 330 is controlled by FSM 207 and is used to select, via multiplexer 326, whether the data bus 327, or data bus 328, or data bus 329 go to output 303 of LNS unit 217. Signal 329 corresponds to the multiply-accumulate quantity $a + b \cdot c$, which is composed by multiplying signal b 209 times signal c 216 by using LNS multiplier 208 (which is implemented by an adder since logarithms convert multiplication to addition) and adding the product to signal a 301 (which is implemented by using an LNS adder). Signal 327 corresponds to the $1/b^2$ quantity (command POW2A) which is formulated by calculating $b \cdot b$ by using the multiplier 324 (adder in LNS) and negating the result 332 (since logarithms convert the calculation of the reciprocal of a number to a negation) by using the two's complement negator 325. The signal 328 corresponds to the $1/b^3$ quantity (command POW3A), which is formulated by calculating $b \cdot b \cdot b$ by using the multipliers 320 and 321, and negating the result 333 by using the two's complement negator 322.

The commands that the iterative matrix processor 200 can carry out, if combined appropriately, can be used to execute all the necessary calculations required by the algorithm described by Equations 7-12. An example of the sequence of commands to calculate only the quantity Φ of Equation 11 is provided in Table 1.

TABLE 1

Command sequence to calculate Φ

| Command | Address | Constant | Description |
|---|---|---|---|
| PUT_X | Not Applicable | 0x0000 | the scalar x is loaded with the LNS number 0x0000 = 1.0 in real |
| LOADVA | bar_addr | 0 | the first row of matrix-register A 210 is loaded with the barrier vector, u, which was stored in matrix-register B 211 starting at address "bar_addr" |
| ADDX | u_addr | 0 | the first row of matrix-register A 210 (containing the barrier vector) is added to the vector stored in the matrix-register B 211 starting at the address u_addr (containing the vector u) and is stored back to the first row of matrix-register A 210 |
| STOREAZ | barPLUSu_addr | 0 | the first row of matrix-register A 210 (containing u + b) is stored in the matrix-register B 211 starting at address barPLUSu_addr, and the first row of matrix-register A 210 becomes 0 |
| POW2A | barPLUSu_addr | Not Applicable | the vector stored in the memory space starting at address barPLUSu_addr (containing u + b) is converted to $1/(u + b)^2$ and stored in the first row of matrix-register A 210 |
| STOREAZ | barPLUSu2_addr | 0 | the first row of matrix-register A 210 (containing $1/(u + b)^2$) is stored in the matrix-register B 211 starting at address barPLUSu2_addr, and the first row of matrix-register A 210 becomes 0 |
| PUT_X | Not Applicable | 0x8000 | the scalar x is loaded with the LNS number 0x8000 = −1.0 in real |
| LOADVA | bar_addr | | the first row of matrix-register A 210 is loaded with the barrier vector, u, which was stored in matrix-register B 211 starting at address bar_addr |
| ADDX | u_addr | 0 | the first row of matrix-register A 210 (containing the barrier vector) is subtracted from the vector stored in the matrix-register B 211 starting at the address u_addr (containing the vector u) and is stored back to the first vector of matrix-register A 210 |
| STOREAZ | barMINUSu_addr | 0 | the first row of matrix-register A 210 (containing u − b) is stored in the matrix-register B 211 starting at address barMINUSu_addr, and the first row of matrix-register A 210 becomes 0 |
| POW2A | barMINUSu_addr | Not Applicable | the vector stored in the memory space starting at address barPLUSu_addr (containing u − b) is converted to $1/(u - b)^2$ and stored in the first row of matrix-register A 210 |
| ADDX | barPLUSu2_addr | 0 | the first row of matrix-register A 210 (containing $1/(u - b)^2$) is subtracted from the vector stored in the matrix-register B 211 starting at the address barPLUSu2_addr (containing the $1/(u + b)^2$) and is stored back to the first vector of matrix-register A 210 |
| STOREAZ | Phi_addr | 0 | the first row of matrix-register A 210 (containing $1/(1 - b)^2 - 1/(u + b)^2$) is stored in the matrix-register B 211 Phi_addr, and the first row of matrix-register A 210 becomes 0 |

The instantiation of the iterative matrix processor 200 for a hardware implementation can be done by different techniques, e.g., schematic capturing of the architecture 200, or description by using a Hardware Description Language (HDL) such as Verilog or VHDL. An example of implementing an iterative matrix processor 200 in Verilog that can carry out the commands listed in FIG. 6 is given in Appendix A. As an example, lines 247-253 of Appendix A describe the implementation of the commands SETX of the table in FIG. 6. The "STARDI" macro on line 249 initiates the communication process between the iterative matrix processor 200 and the GPP 107, and the register "scalar" (which represents the instantiation of the variable x in the iterative matrix processor 200) accepts and stores the data word sent by the GPP 107. Then, the macro "FINISHDI" on line 251 terminates the communications between the GPP 107 and the iterative matrix processor 200. Appendix B provides the corresponding "commands.v" file required by the Verilog description in Appendix A (line 5).

In one embodiment, the auxiliary unit 200 can be designed independently of the microprocessor 102 for each specific application or embedded system for which MPC functionality is required. By designing the auxiliary unit 200 independently of the microprocessor 152, MPC functionality can be added to different applications or embedded systems by adding an appropriate auxiliary unit 200 so long as the application or embedded system includes a microprocessor.

One embodiment of a process for designing an auxiliary unit for use with a microprocessor is provided in FIG. 7. In FIG. 7, the design process for the microprocessor/auxiliary unit architecture uses a codesign methodology, which is an intermediate approach for implementing algorithms between hardware and software. The codesign methodology combines the flexibility of software with the high performance offered by hardware, by implementing the computationally intensive parts in hardware, e.g., the auxiliary unit, while using software executed by the microprocessor to carry out algorithmic control tasks and high-level operations. The computationally demanding parts of the MPC algorithm, determined by performing a profiling study of the MPC algorithm, are migrated to the auxiliary unit, while the rest of the algorithm is executed by the general purpose processor.

As shown in FIG. 7, the system specifications are set and the software-hardware partitioning follows. The software-hardware partitioning can be used to determine both the amount of "speed-up" or gain achieved by the hardware, and the flexibility of the system. The decision on the appropriate partitioning is based on a profiling study, i.e., the execution of the entire algorithm in software, of the MPC algorithm, e.g., the MPC-optimization algorithm described by Equations 7-12, which helps to identify the computationally demanding parts of the MPC algorithm. After the communication protocol or interface between the hardware and software parts is specified, the hardware and software specifications are developed and implemented. The hardware specifications can be implemented by using a Hardware-Description Language (HDL) and the software specifications can be implemented using a high-level-programming language. Next, the hardware and software parts are cosimulated in order to verify the correct functionality and the performance of the complete design. If the verification process fails, then a backward jump is made to the appropriate design step, e.g., if the performance of the system does not meet the specifications, then a new partitioning decision is made and the whole design path is repeated.

An example of the use of the design methodology for a system is applied to a rotating antenna driven by an electric motor. The objective of the system is to use the input voltage of the motor (u V) to rotate the antenna so that the antenna always meets a predefined setpoint (i.e., the antenna points towards a moving object in the plane). The angular positions of the antenna and the moving object ($\theta$ and $\theta_r$ rad, respectively) and the angular velocity of the antenna ($\dot\theta$ rad/sec) are assumed to be measurable. The motion of the antenna can be described by the following discrete-time equations obtained from their continuous-time counterparts by discretization using a sampling time of 0.1 s and Euler's first-order approximation for the derivative:

$$x(k+1) = \begin{bmatrix} \theta(k+1) \\ \dot\theta(k+1) \end{bmatrix} = \tag{21}$$

$$= \begin{bmatrix} 1 & 0.1 \\ 0 & 0.9 \end{bmatrix} x(k) + \begin{bmatrix} 0 \\ 0.0787 \end{bmatrix} u(k), \tag{22}$$

$$y(k) = [\,1\ \ 0\,] x(k), \tag{23}$$

The optimization algorithm portion of the MPC algorithm includes five operational blocks: (i) the initialization of the algorithm by calculating the matrices $\Gamma_u$, $\Gamma_x$, $\Gamma_y$; (ii) the calculation of the gradient given by Equation 8; (iii) the calculation of the Hessian given by Equation 9; (iv) the calculation of the inverse of the Hessian by using the Gauss-Jordan inversion algorithm; and (v) the rest of the operations comprising Newton's algorithm, such as the calculation of Equation 7, the appropriate adjustment of $\mu$, etc. From the profiling analysis, the Gauss-Jordan inversion algorithm can be determined to be the main bottleneck of the optimization algorithm. Additionally, as the control horizon increases, i.e., M>8, the calculation of the Hessian becomes increasingly more time-consuming compared to the Gradient function. Since the computational complexity of the Hessian is based almost entirely on $\Psi$ (the factor $\Gamma_u$, is precomputed and is only invoked from memory) a conclusion can be made that the cubing and inversion operations add a substantial burden to the computational effort. The initialization of the optimization algorithm takes place only once at the beginning of the simulation, thus its contribution to the total computational cost is essentially unobservable. In addition, the matrices $\Gamma_u$, $\Gamma_x$ and $\Gamma_y$ are precomputed and remain constant while the optimization algorithm is executed.

By using the profiling analysis, a design choice can be made to have a hardware-software architecture that performs well both in operations involved in matrix manipulations, such as multiply-accumulate, and in real-number squarings, cubings and inversions (included in the evaluation of $\Phi$ and $\Psi$).

In one embodiment, the auxiliary unit is designed for the requirements of a particular problem in which Newton's optimization algorithm is used, i.e., there are no general commands implemented such as matrix-by-matrix multiplication. However, in other embodiments, the auxiliary unit can be extended to include more operations necessary for any kind of an algorithm that includes matrix operations. Such an extension of the auxiliary unit permits the auxiliary unit to be used as a hardware accelerator, for applications that require efficient low-power hardware implementations like the ones found in the Digital Signal Processing (DSP) or the Neural Networks (NN) fields.

In another embodiment, the microprocessor has to send each command to the auxiliary unit, and at the end of the optimization cycle receives back the optimal move from the auxiliary unit. However, in other embodiments, this dependence between the two ends can be reduced by introducing an address generator that reads the sequence of commands stored in a local memory, and sends them to the auxiliary unit. In this embodiment, the microprocessor has to initialize the auxiliary unit by sending the matrices describing the model under control, and during operation the microprocessor has to just read the optimal move and to send back the feedback of the system and the desired setpoint. This embodiment would be more efficient in terms of performance because of the elimination of the extra cycles required by the microprocessor to invoke a command from its memory and send it to the auxiliary unit. Moreover, the program memory of the microprocessor can be smaller and there can be time saved to be spent on other tasks.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the embedded MPC architecture as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A system comprising:
a plant controlled by real-time model predictive control;
an iterative matrix processor configured to perform computations on vectors and matrices stored in a logarithmic format;
a general purpose processor in communication with the plant and the iterative matrix processor to transfer information between the plant and the iterative matrix processor, the general purpose processor being configured to issue a sequence of instructions to the iterative matrix processor to implement the model predictive control; and
wherein each instruction of the sequence of instructions initiates a series of element-by-element operations in the logarithmic format on scalars, vectors and matrices stored in the iterative matrix processor.

2. The system of claim 1 wherein:
the iterative matrix processor is configured to execute matrix by vector multiplication, scalar by vector multiplication, matrix-element zeroing, matrix-element negation, matrix-element reciprocal, vector-reciprocal square, vector-reciprocal cube, vector sum, vector multiply-accumulate, or matrix multiply-accumulate; and
the matrix-element reciprocal operation results in a negation in the logarithmic format, the vector-reciprocal square operation results in a shift and negation in the logarithmic format, the vector-reciprocal cube operation results in a shift, add and negation in the logarithmic format.

3. The system of claim 2 wherein the iterative matrix processor further comprises a pipelined logarithmic processor, the pipelined logarithmic processor is configured to execute matrix by vector multiplication, scalar by vector multiplication, vector sum, vector multiply-accumulate, matrix multiply-accumulate, matrix-element reciprocal, vector-reciprocal square, and vector-reciprocal cube.

4. The system of claim 3 wherein the iterative matrix processor delays computation with a later portion of a matrix while computing with an earlier portion of the matrix in response to a size of the matrix being small compared to a depth of the pipelined logarithmic processor.

5. The system of claim 4 wherein the computation delay is a predetermined number of clock cycles related to the depth of the pipelined logarithmic processor.

6. A controller to implement a real-time model predictive control algorithm, the controller comprising:
a microprocessor to execute a portion of the model predictive control algorithm; and
an iterative matrix processor configured to receive an instruction from the microprocessor to perform at least one matrix calculation of the model predictive control algorithm, and the iterative matrix processor being configured to operate using a logarithmic number system.

7. The controller of claim 6 wherein the iterative matrix processor is configured to execute a single multiply-accumulate operation at each clock cycle.

8. The controller of claim 6 wherein the iterative matrix processor is configured to execute multiple multiply-accumulate operations at each clock cycle.

9. The controller of claim 6 wherein the iterative matrix processor is configured to execute one-bit of a single multiply-accumulate operation at each clock cycle.

10. The controller of claim 6 wherein the iterative matrix processor is configured to execute at least one of matrix by vector multiplication, scalar by vector multiplication, matrix-element zeroing, matrix-element negation, matrix-element reciprocal, vector-reciprocal square, vector-reciprocal cube, vector sum, vector multiply-accumulate, or matrix multiply-accumulate.

11. A model predictive controller comprising:
a general purpose processor to execute a model predictive control algorithm;
an iterative matrix processor in communication with the general purpose processor, the iterative matrix processor being configured to execute at least one matrix calculation required by the model predictive control algorithm in an iterative process in response to receiving an instruction from the general purpose processor; and
wherein the iterative matrix processor performs the at least one matrix calculation using a logarithmic number system.

12. The model predictive controller of claim 11 wherein the general purpose processor comprises a microprocessor, a memory device, at least one input/output connection and at least one bus interconnecting the microprocessor, the memory device and the at least one input/output connection.

13. The model predictive controller of claim 11 wherein the iterative matrix processor comprises a control unit, a plurality of data memory units and a logarithmic number unit.

14. The model predictive controller of claim 13 wherein the control unit is a finite state machine.

15. The model predictive controller of claim 13 wherein the logarithmic number unit is a pipelined arithmetic logic unit.

16. The model predictive controller of claim 11 wherein the general purpose processor and the iterative matrix processor are configured to operate using a word length of up to 32 bits.

17. The model predictive controller of claim 11 wherein the general purpose processor provides the iterative matrix processor with required matrices for optimizing the model predictive control algorithm at a start of the model predictive control algorithm, and the iterative matrix processor stores the required matrices for later use in optimizing the model predictive control algorithm.

18. The model predictive controller of claim 17 wherein the general purpose processor provides the iterative matrix processor with a sequence of commands to optimize the model predictive algorithm and the iterative matrix processor provides the general purpose processor with a control command.

* * * * *